United States Patent

Noguchi et al.

Patent Number: 5,273,848
Date of Patent: Dec. 28, 1993

[54] CATHODE MATERIAL FOR LITHIUM BATTERY AND METHOD FOR PRODUCING THE SAME

[75] Inventors: Minoru Noguchi; Naohiko Oki; Kohichi Miyashita; Atsushi Demachi; Kenji Sato, all of Wako, Japan

[73] Assignee: Honda Giken Kogyo Kabushiki Kaisha, Tokyo, Japan

[21] Appl. No.: 849,506

[22] Filed: Mar. 11, 1992

[30] Foreign Application Priority Data

Mar. 15, 1991 [JP] Japan .................................. 3-74188
Nov. 22, 1991 [JP] Japan .................................. 3-332799

[51] Int. Cl.$^5$ .............................................. H01M 4/48
[52] U.S. Cl. .................................. 429/218; 429/192; 429/194; 252/182.1
[58] Field of Search ............ 429/218, 194, 192, 191; 252/182.1, 521; 423/635, 593

[56] References Cited

U.S. PATENT DOCUMENTS

| | | | |
|---|---|---|---|
| 4,675,260 | 6/1987 | Sakurai et al. | 429/218 X |
| 4,737,424 | 4/1988 | Tobishima et al. | 429/218 X |
| 4,751,157 | 6/1988 | Uchiyama et al. | 429/218 X |
| 4,751,158 | 6/1988 | Uchiyama et al. | 429/218 X |
| 4,853,304 | 8/1989 | Ebner et al. | 252/62.2 |

Primary Examiner—Anthony Skapars
Attorney, Agent, or Firm—Burgess, Ryan & Wayne

[57] ABSTRACT

A cathode material for a lithium battery comprising an amorphous solid solution comprising $V_2O_5$, $CoO_2$, $P_2O_5$ and MO, wherein M represents an alkaline earth metal element and $CoO_2$ is contained in an amount of 0 to 10 mol % based on $V_2O_5$, which is produced by melting a mixture of $V_2O_5$, $CoO_2$, $P_2O_5$ and MO to form a melt, wherein $CoO_2$ is contained in an amount of 0 to 10 mol % based on $V_2O_5$, and then putting the melt into water or pressing the melt with metal plates to pulverize it.

5 Claims, 5 Drawing Sheets

CATHODE MATERIAL FOR LITHIUM BATTERY AND METHOD FOR PRODUCING THE SAME

BACKGROUND OF THE INVENTION

The present invention relates to a cathode material used in a lithium battery in which lithium or a lithium alloy is used as an anode material, and a method for producing the same.

Various sulfides and oxides have hitherto been proposed as cathode materials of lithium batteries. Compound oxides and amorphous compounds have also been proposed. For example, Japanese Patent Unexamined Publication No. 59-134561/1984 discloses a cathode active material composed of a solid solution prepared by adding phosphorus pentaoxide to vanadium pentaoxide and burning the resulting mixture, followed by rapid quenching. Japanese Patent Unexamined Publication No. 2-33868/1990 discloses a cathode formed of an amorphous powder prepared by melting and rapidly quenching a mixture of vanadium pentaoxide and 30 mol % or less of phosphorus pentaoxide. Further, Japanese Patent Unexamined Publication No. 62-176054/1987 proposes a lithium battery comprising a ternary oxide compound consisting of $V_2O_5$, $Li_2O$ and $P_2O_5$ as a cathode material. Even if these cathode materials are used, however, the problem can not be solved that the repetition of charge and discharge causes a reduction in capacity. Accordingly, no cathode material satisfactory in cycle stability has been obtained yet. As to the amorphous compounds, it has been desired to obtain the stable compounds easily.

SUMMARY OF THE INVENTION

It is therefore a primary object of the present invention to provide a vanadium pentaoxide cathode material satisfactory in charge-discharge cycle stability and stabilized in an amorphous state.

Another object of the present invention is to provide a method for producing the stable amorphous cathode material easily.

The present invention provides a cathode material for a lithium battery having an amorphous solid solution comprising $V_2O_5$, $CoO_2$, $P_2O_5$ and MO, wherein M represents an alkaline earth metal element and $CoO_2$ is contained in an amount of 0 to 10 mol % based on $V_2O_5$.

Further, the present invention provides a method for producing a cathode material for a lithium battery which comprises melting a mixture of $V_2O_5$, $CoO_2$, $P_2O_5$ and MO to form a melt, wherein M represents an alkaline earth metal element and $CoO_2$ is contained in an amount of 0 to 10 mol % based on $V_2O_5$, and then putting the melt into water to pulverize it.

Furthermore, the present invention provide a method for producing a cathode material for a lithium battery which comprises melting a mixture of $V_2O_5$, $CoO_2$, $P_2O_5$ and MO to form a melt, wherein M represents an alkaline earth metal element and $CoO_2$ is contained in an amount of 0 to 10 mol % based on $V_2O_5$, and then pressing the melt with metal plates to pulverize it.

DESCRIPTION OF THE PREFERRED EMBODIMENTS

Figure 1:
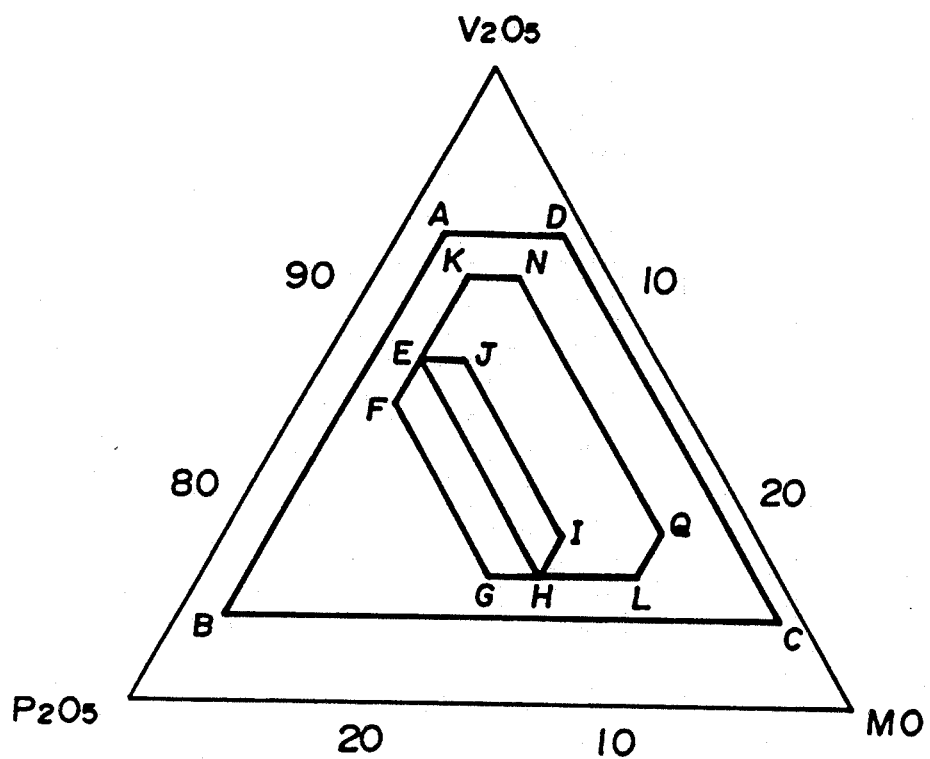
FIG. 1 is a graph showing a composition of a cathode material for a lithium battery.

The cathode material of the present invention comprises the amorphous solid solution comprising $V_2O_5$, $CoO_2$, $P_2O_5$ and MO, wherein M represents an alkaline earth metal element and $CoO_2$ is contained in an amount of 0 to 10 mol % based on $V_2O_5$.

Namely, the cathode material of the present invention contains $V_2O_5$, $CoO_2$, $P_2O_5$ and MO as essential ingredients and $V_2O_5$ is partly replaced by $CoO_2$ as so desired, thereby improving the cycle stability of the resulting lithium battery.

The alkaline earth metal oxide (MO) is preferably MgO or CaO.

The ratio of the respective ingredients contained in the solid solution is as follows:

$V_2O_5$: 64 to 92 mol %, preferably 65 to 80 mol %
$CoO_2$: 0 to 10 mol % based on $V_2O_5$, preferably 1 to 6 mol %
$P_2O_5$: 1 to 24 mol %, preferably 2 to 15 mol %
MO: 2 to 25 mol %, preferably 2 to 15 mol %
(wherein $V_2O_5 + CoO_2 + P_2O_5 + MO = 100$ mol %)

Less than 64 mol % of $V_2O_5$ reduces the discharge capacity, whereas more than 92 mol % of $V_2O_5$ causes the difficulty in making the solid solution amorphous, which leads to the unsatisfactory result as the cathode material. If the content of $CoO_2$ is less than 1 mol % based on $V_2O_5$, the effect caused by addition of $CoO_2$(-namely, a more improvement in cycle stability) is little. On the other hand, if the content of $CoO_2$ exceeds 10 mol %, both the initial capacity and cycle stability are decreased. Further, less than 1 mol % of $P_2O_5$ brings about the difficulty in making the solid solution amorphous, which leads to the unsatisfactory result as the cathode material, whereas more than 24 mol % of $P_2O_5$ reduces the discharge capacity. Furthermore, less than 2 mol % of MO brings about the difficulty in making the solid solution amorphous, which leads to the unsatisfactory result as the cathode material, whereas more than 25 mol % of MO reduces the discharge capacity.

It is preferred that the solid solution comprises 74 to 92 mol % of $V_2O_5 + CoO_2$, 1 to 24 mol % of $P_2O_5$ and 2 to 25 mol % of MO, wherein the content of $CoO_2$ is 0 to 10 mol % based on $V_2O_5$.

More preferably, the cathode material of the present invention comprises the amorphous solid solution comprising $V_2O_5$, $CoO_2$, $P_2O_5$ and MO, wherein M represents an alkaline earth metal element and $CoO_2$ is contained in an amount of 0 to 10 mol % based on $V_2O_5$, in a molar ratio within the range surrounded by line AB connecting point A ($V_2O_5 + CoO_2 = 92$ mol %, $P_2O_5 = 6$ mol %, MO = 2 mol %) and point B ($V_2O_5 + CoO_2 = 74$ mol %, $P_2O_5=24$ mol %, MO=2 mol %), line BC connecting point B and point C ($V_2O_5+CoO_2=74$ mol %, $P_2O_5=1$ mol %, MO=25 mol %), line CD connecting point C and point D ($V_2O_5+CoO_2=92$ mol %, $P_2O_5=1$ mol %, MO=7 mol %) and line AD connecting point A and point D shown in FIG. 1.

Namely, the preferred cathode material of the present invention comprises the amorphous solid solution comprising $V_2O_5$, $P_2O_5$ and MO, or $V_2O_5$, $CoO_2$, $P_2O_5$ and MO in a molar ratio within the range surrounded by line AB, line BC, line CD and line AD shown in FIG. 1.

If more that 92 mole % of $V_2O_5+CoO_2$, less than 1 mol % of $P_2O_5$ or less than 2 mol % of MO is contained, it becomes difficult to make the solid solution amorphous, and the satisfactory result can not be obtained as the cathode material. On the other hand, the content of less than 74 mol % of $V_2O_5+CoO_2$ results in a reduction in discharge capacity. When the solid solution is quenched in water, the preferred molar ratio is within the range surrounded by line EF connecting point E ($V_2O_5+CoO_2=86$ mol %, $P_2O_5=10$ mol %, MO=4 mol %) and point F ($V_2O_5+CoO_2=84$ mol %, $P_2O_5=12$ mol %, MO=4 mol %), line FG connecting point F and point G ($V_2O_5+CoO_2=76$ mol %, $P_2O_5=12$ mol %, MO=12 mol %), line GH connecting point G and point H ($V_2O_5+CoO_2=76$ mol %, $P_2O_5$32 10 mol %, MO=14 mol %), line HI connecting point H and point I ($V_2O_5+CoO_2=78$ mol %, $P_2O_5=8$ mol %, MO=14 mol %), line IJ connecting point I and point J ($V_2O_5+CoO_2=86$ mol %, $P_2O_5=8$ mol %, MO=6 mol %) and line EJ connecting point E and point J, because $P_2O_5$ is partly dissolved out of the mixture into water. When the solid solution is quenched by the metal plate pressing method, the preferred molar ratio is within the range surrounded by line EH connecting point E and point H, line HL connecting point H and point L ($V_2O_5+CoO_2=76$ mol %, $P_2O_5=6$ mol %, MO=18 mol %), line LQ connecting point L and point Q ($V_2O_5+CoO_2=78$ mol %, $P_2O_5=4$ mol %, MO=18 mol %), line QN connecting point Q and point N ($V_2O_5+CoO_2=90$ mol %, $P_2O_5=4$ mol %, MO=6 mol %), line NK connecting point N and point K ($V_2O_5+CoO_2=90$ mol %, $P_2O_5=6$ mol %, MO=4 mol %) and line EK connecting point E and point K, because of a slight fluctuation in the composition of the mixture. In FIG. 1, however, if $CoO_2$ is contained in an amount of more than 10 mol % based on $V_2O_5$, both the initial capacity and cycle stability are reduced for the reason described above.

The cathode material comprising the amorphous solid solution having a molar ratio within this range is satisfactory in cycle stability.

Methods for producing the cathode materials of the present invention are described below.

In the methods of the present invention, $V_2O_5$, $P_2O_5$ and MO, or $V_2O_5$, $CoO_2$, $P_2O_5$ and MO described above are mixed and melted to form a melt, and then the melt is put into water or pressed with metal plates. In melting, it is preferred that the mixture is kept at 200° to 500° C. for 30 minutes to 6 hours and further at 560° to 740° C. for 5 minutes to 1 hour.

The cathode material thus obtained comprises an amorphous solid solution.

In this specification, the term "amorphous" means a state in which a solid solution does not have an atomic structure with the long-range order and a solution is essentially frozen (noncrystal).

The term "solid solution" means a mixture which forms a homogeneous phase and is in a solid state.

In order to obtain amorphous solid solutions, rapid quenching is usually required. In general, the melts are rapidly quenched at room temperature at a quenching rate of about $10^6$ ° C./sec using twin copper rollers. In the present invention, MO is mixed with $V_2O_5$-$P_2O_5$ systems or $V_2O_5$-$CoO_2$-$P_2O_5$ systems, whereby the amorphous solid solutions can be obtained even by the water quenching method (rapid quenching rate: $10^2$ to $10^3$ ° C./sec) or the metal pressing method (rapid quenching rate: 10 to $10^4$ ° C./sec) which is low in rapid quenching rate. The amorphous solid solutions can therefore be easily obtained without using a large-scaled rapid quenching device. The resulting amorphous solid solutions are very stable, and the excellent cathode materials can be obtained by pulverizing the amorphous solid solutions mechanically.

When the cathode materials are used to prepare cathodes, the grain size of the cathode materials is not necessarily restricted. However, the use of the cathode materials having a grain size of 5 μm or less can provide highly efficient cathodes. In this case, conductive agents such as acetylene black and binding agents such as powdered fluororesins may be added to the cathode materials to form mixtures. The mixtures are then kneaded with organic solvents, and rolled through rollers, followed by drying to prepare the cathodes. The amount of the conductive agents added may be 5 to 50 parts by weight per 100 part by weight of cathode material, and preferably 7 to 10 parts by weight. In the present invention, the cathode materials are satisfactory in conductivity, so that the amount of the conductive agents used can be reduced. The binding agents are preferably compounded in an amount of 5 to 10 parts by weight per 100 parts by weight of cathode material.

Any nonaqueous electrolytes are used in batteries using the cathode materials of the present invention, as long as they are chemically stable to the cathode materials and anode materials and lithium ions are transferable therethrough to electrochemically react with the cathode active materials. In particular, compounds formed by combinations of cations and anions are preferably used. Examples of such cations include but are not limited to $Li^+$, and examples of such anions include but are not limited to halide anions of the group Va elements such as $PF_6^-$, $AsF_6^-$ and $SbF_6^-$, halogen anions such as $I^-$ ($I_3^-$), $Br^-$ and $Cl^-$, perchlorate ($ClO_4^-$), $HF_2^-$, $CF_3SO_3^-$ and $SCN^-$. Specific examples of the electrolytes having such cations and anions include $LiPF_6$, $LiAsF_6$, $LiSbF_6$, $LiBF_4$, $LiClO_4$, LiI, LiBr, LiCl, $LiAlCl_4$, $LiHF_2$, LiSCN, and $LiSO_3CF_3$. Of these compounds, $LiPF_6$, $LiAsF_6$, $LiBF_4$, $LiClO_4$, $LiSbF_6$ and $LiSO_3CF_3$ are particularly preferred.

The nonaqueous electrolytes are generally used in a state in which the electrolytes have been dissolved in solvents. In this case, there is no particular restriction on the solvents. However, solvents having a relatively high polarity are preferably used. Specific examples of such solvents include propylene carbonate, ethylene carbonate, butylene carbonate, tetrahydrofuran, 2-methyltetrahydrofuran, dioxolane, dioxane, dimethoxyethane, glymes such as diethylene glycol dimethyl ether, lactones such as γ-butyrolactone, phosphates such as triethyl phosphate, borates such as triethyl borate, sulfur compounds such as sulfolane and dimethyl sulfoxide, nitriles such as acetonitrile, amides such as dimethylformamide and dimethylacetamide, dimethyl sulfate, nitromethane, nitrobenzene and dichloroethane. These solvents may be used alone or in combination. Of these solvents, one selected from ethylene carbonate, propylene carbonate, butylene carbonate, tetrahydrofuran, 2-methyltetrahydrofuran, dimethoxyethane, dioxolane and γ-butyrolactone or mixtures thereof are particularly appropriate.

The nonaqueous electrolytes also include organic solid electrolytes composed of polymers such as polyethylene oxide, polypropylene oxide, polyethylene oxide cross-linked with isocyanates and phosphazene polymers having ethylene oxide oligomers as side chains which are impregnated with the above-described nonaqueous electrolytes; and inorganic solid electrolytes such as inorganic ion derivatives (for example, $Li_3N$ and $LiBCl_4$) and lithium glasses (for example, $Li_4SiO_4$ and $Li_3BO_3$).

A lithium secondary battery using the cathode material of the present invention is described in more detail by reference to FIG. 2.

Figure 2:
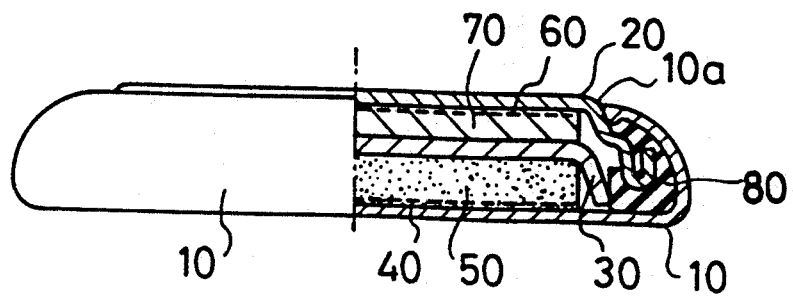
FIG. 2 is a partial cross sectional front view showing a lithium secondary battery using a cathode material for a lithium battery of the present invention.

Referring to FIG. 2, the lithium secondary battery using the cathode material of the present invention comprises a button-shaped cathode case 10 having an opening 10a, an anode cap 20 which seals the opening 10a, a separator 30 with fine perforations which partitions the inside of the cathode case 10 into two spaces, a cathode 50 accommodated in the space on the cathode side and having a cathode collector 40 arranged on the side of the cathode case 10, and an anode 70 accommodated in the space on the anode side and having an anode collector 60 arranged on the side of the anode cap 20.

Anode materials used as the above-described anode 70 include, for example, lithium and lithium alloys which can occlude and release lithium. In this case, the group IIa, IIb, IIIa, IVa and Va metals or alloys thereof containing lithium can be used as the lithium alloys. In particular, Al, In, Sn, Pb, Bi, Cd and Zn or alloys thereof containing lithium are preferably used.

As the separator 30 described above, nonwoven, woven and knitted fabrics made of synthetic resins such as polytetrafluoroethylene, polypropylene and polyethylene can be used. The fabrics are porous, and the electrolytes can be passed therethrough and contained therein.

The reference numeral 80 designates an insulating polyethylene packing arranged along the inner wall of the cathode case 10 for supporting the anode cap 20 in an insulated state.

As described above, according to the present invention, the stable amorphous solid solutions of $V_2O_5$-$P_2O_5$-MO or $V_2O_5$-$CoO_2$-$P_2O_5$-MO can be easily obtained. Further, the lithium batteries excellent in cycle stability can be obtained by employing the solid solutions thus obtained as the cathode materials.

The following examples are given to illustrate the present invention and are not intended to be limitations on the scope of the invention.

EXAMPLE 1

$V_2O_5$, $P_2O_5$ and CaO were weighed and mixed in a mortar so as to give a molar ratio of 84:8:8. Then, the mixture was maintained in an alumina crucible at 400° C. for 30 minutes, and further maintained at 740° C. for 10 minutes to obtain a molten $V_2O_5$-$P_2O_5$-CaO salt. The molten salt was put into pure water at room temperature to obtain a powder of an amorphous $V_2O_5$-$P_2O_5$-CaO solid solution. The X-ray diffraction pattern of the resulting powder is shown as (A) in FIG. 3.

COMPARATIVE EXAMPLE 1

A powder was prepared in the same manner as with Example 1 with the exception that $V_2O_5$ and $P_2O_5$ were used in a molar ratio of 84:16. The X-ray diffraction pattern of the resulting powder is shown as (B) in FIG. 3.

EXAMPLE 2

A molten $V_2O_5$-$P_2O_5$-CaO salt prepared in the same manner as with Example 1 was poured on a copper plate (40 Cm×40 cm×1 cm in thickness), and then a copper plate was placed thereon to obtain a powder of an amorphous $V_2O_5$-$P_2O_5$-CaO solid solution. The X-ray diffraction pattern of the resulting powder is shown as (C) in FIG. 3.

Figure 3:
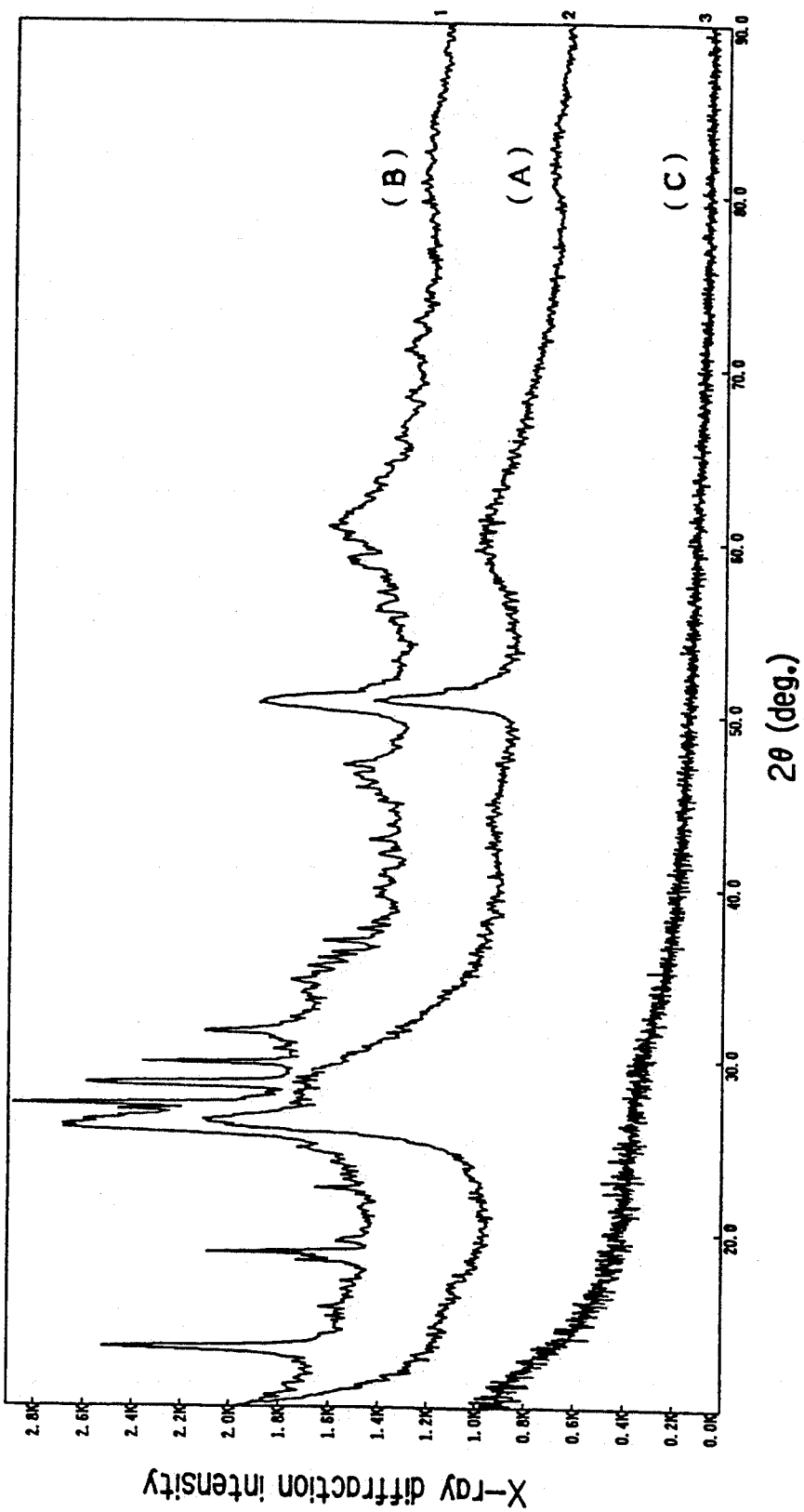
FIG. 3 shows an X-ray diffraction intensity chart of powders obtained by putting a melt into water (Example 1 and Comparative Example 1) and by pressing the melt with metal plates (Example 2)

FIG. 3 reveals that the $V_2O_5$-$P_2O_5$ system does not give an amorphous solid solution, but addition of CaO makes it possible to obtain the amorphous solid solution by the water quenching method or the metal plate pressing method.

EXAMPLE 3

A powder of an amorphous $V_2O_5$-$P_2O_5$-CaO solid solution was prepared in the same manner as with Example 1 with the exception that $V_2O_5$, $P_2O_5$ and CaO were used in a molar ratio of 80:10:10. Then, 80% by weight of the resulting powder was mixed with 10% by weight of acetylene black as a conductive agent and 10% by weight of the powdered fluororesin as a binding agent. The mixture was kneaded with ethanol, an organic solvent, and rolled through rollers to form a sheet having a thickness of about 200 μm. After vacuum drying at 150° C., a disk with a diameter of 20 mm was stamped out of the sheet. The thus-obtained disk was used as a cathode.

On the other hand, an anode was prepared by pressing lithium on an aluminum plate stamped out to a specified size, and alloying aluminum with lithium in an electrolyte. An electrolyte was prepared by dissolving 1 mol/l of $LiClO_4$ in a mixed solvent of propylene carbonate and diethylene glycol dimethyl ether. Using the above-described cathode, anode and electrolyte, the battery shown in FIG. 2 was assembled.

Figure 4:
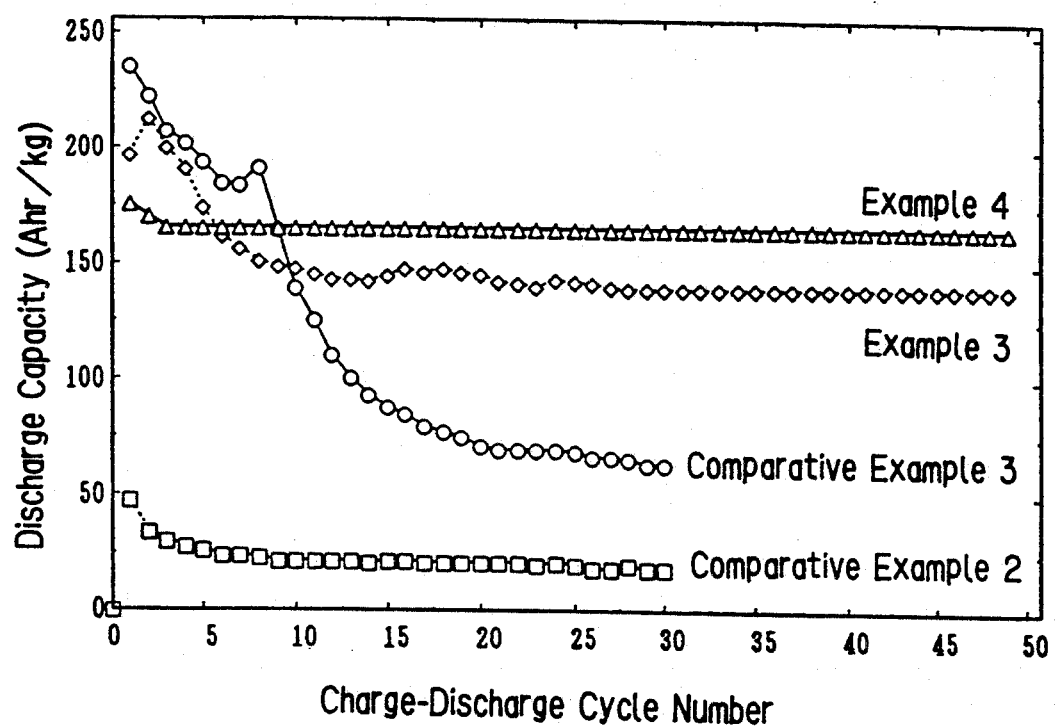
FIG. 4 is a graph showing the cycle stability of lithium secondary batteries (Examples 3 and 4 and Comparative Examples 2 and 3)

Using this battery, the cycle stability was measured at a discharge termination voltage of 2 V, at a charge termination voltage of 4 V and at a charge-discharge current density of 1.6 $mA/cm^2$. The results are shown in FIG. 4.

EXAMPLE 4

A powder of an amorphous $V_2O_5$-$P_2O_5$-CaO solid solution was prepared in the same manner as with Example 2 with the exception that $V_2O_5$, $P_2O_5$ and CaO were used in a molar ratio of 84:10:6. Using the resulting powder, a battery was assembled similarly with Example 3, and the cycle stability was measured. The results are shown in FIG. 4.

COMPARATIVE EXAMPLE 2

Using the powder obtained in Comparative Example 1, a battery was produced similarly with Example 3, and the cycle stability was measured similarly. The results are shown in FIG. 4.

COMPARATIVE EXAMPLE 3

Using $V_2O_5$ powder, a battery was produced similarly with Example 3, and the cycle stability was measured similarly. The results are shown in FIG. 4.

As apparent from FIG. 4, the cathode materials containing the amorphous $V_2O_5$-$P_2O_5$-CaO solid solutions obtained by the water quenching method and the metal plate pressing method of the present invention are excellent in cycle stability.

EXAMPLE 5

Figure 5:
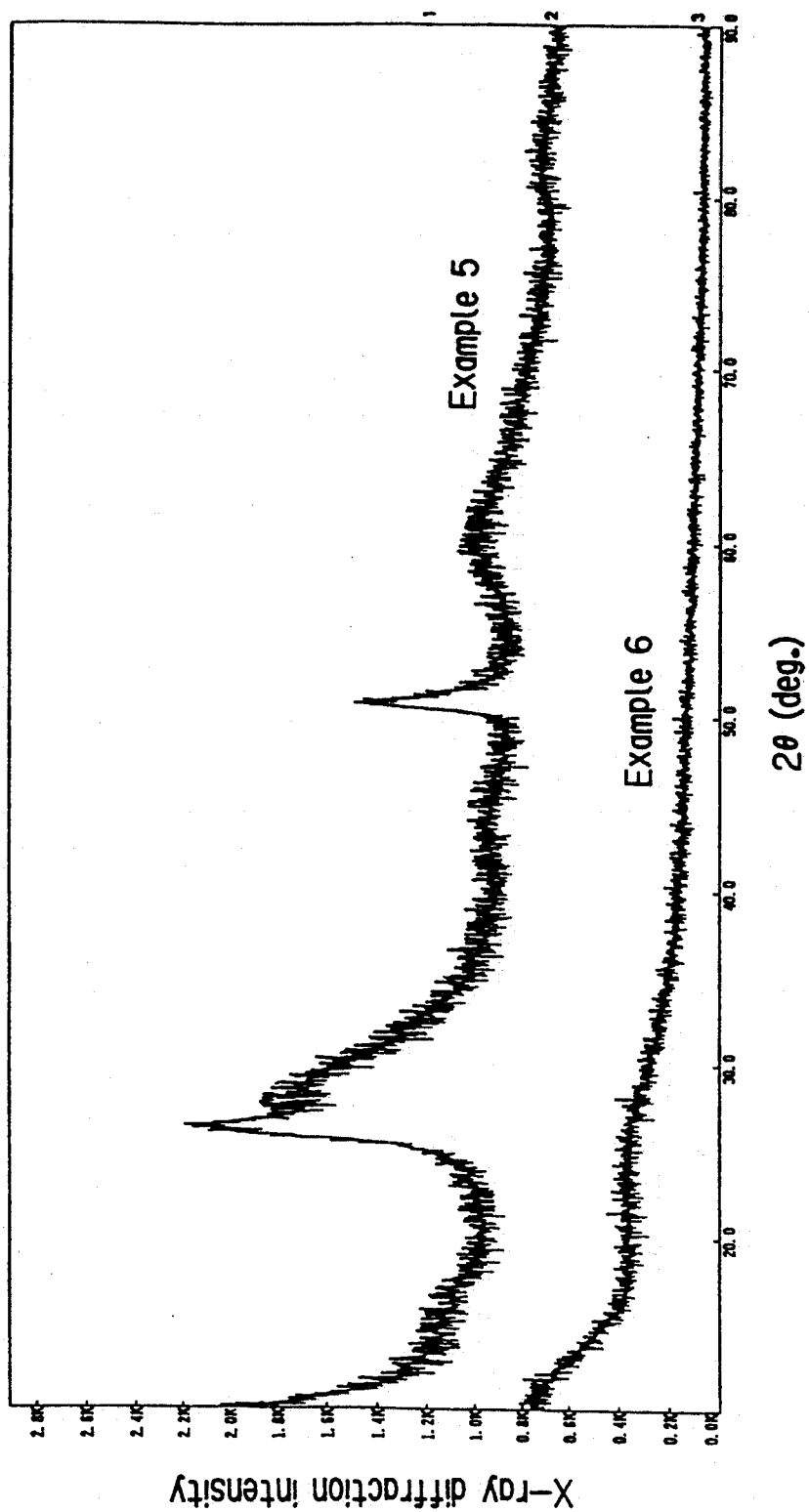
FIG. 5 shows an X-ray diffraction intensity chart of cathode material powders obtained in Examples 5 and 6.

$V_2O_5$, $CoCO_3$, $P_2O_5$ and CaO were weighed and mixed in a mortar so as to give a molar ratio of 75:5:10:10. Then, the mixture was maintained in an alumina crucible at 400° C. for 30 minutes, and further maintained at 740° C. for 10 minutes to obtain a molten $V_2O_5$-$CoO_2$-$P_2O_5$-CaO salt. The molten salt was put into pure water at room temperature to obtain a powder of an amorphous $V_2O_5$-$CoO_2$-$P_2O_5$-CaO solid solution. The X-ray diffraction pattern of the resulting powder is shown in FIG. 5.

Then, 80% by weight of the powder thus obtained was mixed with 10% by weight of acetylene black as a conductive agent and 10% by weight of the powdered fluororesin as a binding agent. The mixture was kneaded with ethanol, an organic solvent, and rolled through rollers to form a sheet having a thickness of about 200 μm. After vacuum drying at 150° C., a disk with a diameter of 20 mm was stamped out of the sheet. The thus-obtained disk was used as a cathode.

On the other hand, an anode was prepared by pressing lithium on an aluminum plate stamped out to a specified size, and alloying aluminum with lithium in an electrolyte. An electrolyte was prepared by dissolving 1 mol/l of $LiClO_4$ in a mixed solvent of propylene carbonate and diethylene glycol dimethyl ether. Using the above-described cathode, anode and electrolyte, the battery shown in FIG. 2 was assembled.

Figure 6:
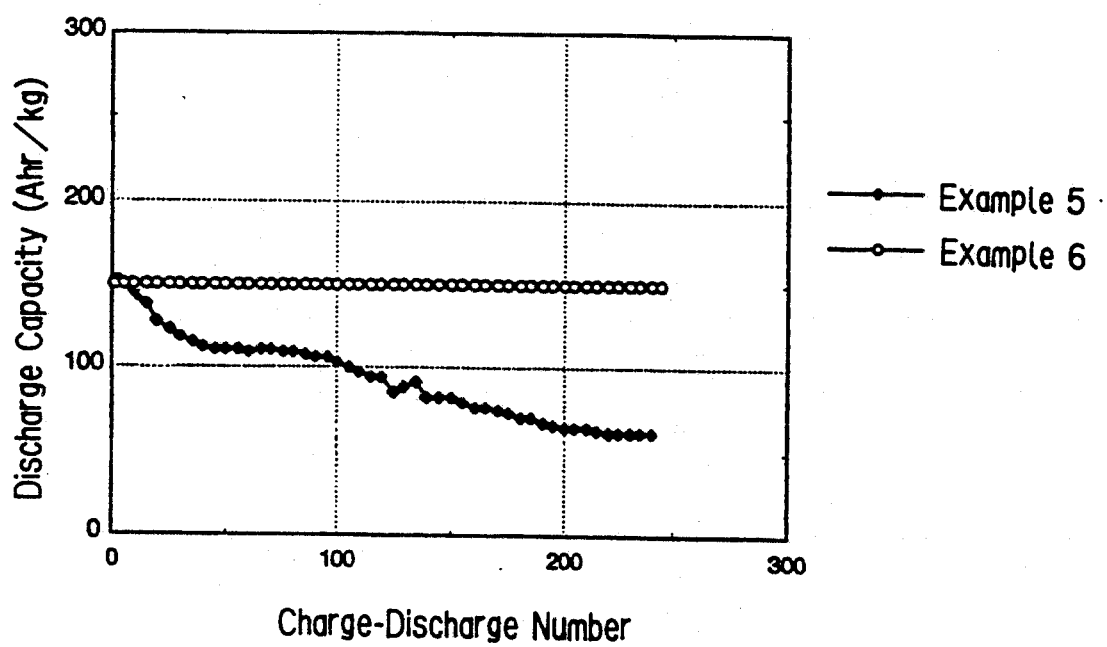
FIG. 6 is a graph showing the cycle stability of lithium secondary batteries (Examples 5 and 6).

Using this battery, the cycle stability was measured at a discharge termination voltage of 2 V, at a charge termination voltage of 4 V and at a charge-discharge current density of 1.6 mA/cm$^2$. The results are shown in FIG. 6.

EXAMPLE 6

A molten $V_2O_5$-$CoO_2$-$P_2O_5$-CaO salt prepared in the same manner as with Example 5 was poured on a copper plate (40 Cm × 40 cm × 1 cm in thickness), and then a copper plate was placed thereon to obtain a powder of an amorphous $V_2O_5$-$CoO_2$-$P_2O_5$-CaO solid solution. The X-ray diffraction pattern of the resulting powder is shown in FIG. 5.

Using the resulting powder, a battery was assembled similarly with Example 5, and the cycle stability was measured. The results are shown in FIG. 6.

As apparent from FIG. 6, the cathode materials containing the amorphous $V_2O_5$-$CoO_2$-$P_2O_5$-CaO solid solutions obtained by the water quenching method and the metal plate pressing method of the present invention are excellent in cycle stability.

What is claimed is:

1. A cathode material for a lithium battery comprising an amorphous solid solution comprising $V_2O_5$, $CoO_2$, $P_2O_5$ and MO, wherein M represents an alkaline earth metal element said amorphous solid solution comprises 64 to 92 mol % of $V_2O_5$, not more than 10 mol % based on $V_2O_5$ of $CoO_2$, 1 to 24 mol % of $P_2O_5$ and 2 to 25 mol % of MO (wherein $V_2O_5+CoO_2+P_2O_5+MO=100$ mol %).

2. The cathode material as claimed in claim 1, in which said amorphous solid solution comprises 74 to 92 mol % of $V_2O_5+CoO_2$, 1 to 24 mol % of $P_2O_5$ and 2 to 25 mol % of MO (wherein $CoO_2$ is contained in an amount of not more than 10 mol % based on $V_2O_5$ and $V_2O_5+CoO_2+P_2O_5+MO=100$ mol %).

3. The cathode material as claimed in claim 1, in which said amorphous solid solution comprises $V_2O_5$, $CoO_2$, $P_2O_5$ and MO in a molar ratio within the range surrounded by line AB connecting point A ($V_2O_5+CoO_2=92$ mol %, $P_2O_5=6$ mol %, MO=2 mol %) and point B ($V_2O_5+CoO_2=74$ mol %, $P_2O_5=24$ mol %, MO=2 mol %), line BC connecting point B and point C ($V_2O_5+CoO_2=74$ mol %, $P_2O_5=1$ mol %, Mo=25 mol %), line CD connecting point C and point D ($V_2O_5+CoO_3=92$ mol %, $P_2O_5=1$ mol %, MO=7 mol %) and line AD connecting point A and point D shown in FIG. 1 (wherein $CoO_2$ is contained in an amount of not more than 10 mol % based on $V_2O_5$).

4. The cathode material as claimed in claim 1, in which said amorphous solid solution comprises $V_2O_5$, $CoO_2$, $P_2O_5$ and MO in a molar ratio within the range surrounded by line EF connecting point E ($V_2O_5+CoO_2=86$ mol %, $P_2O_5=10$ mol %, MO=4 mol %) and point F ($V_2O_5+CoO_2=84$ mol %, $P_2O_5=12$ mol %, MO=4 mol %), line FG connecting point F and point G ($V_2O_5+CoO_2$ 76 mol %, $P_2O_5=12$ mol %, MO=12 mol %), line GH connecting point G and point H ($V_2O_5+CoO_2=76$ mol %, $P_2O_5=10$ mol %, MO=14 mol %), line HI connecting point H and point I ($V_2O_5+CoO_2=78$ mol %, $P_2O_5=8$ mol %, MO=14 mol %), line IJ connecting point I and point J ($V_2O_5+CoO_2=86$ mol %, $P_2O_5=8$ mol %, MO=6 mol %) and line EJ connecting point E and point J shown in FIG. 1 (wherein $CoO_2$ is contained in an amount of not more than 10 mol % based on $V_2O_5$).

5. The cathode material as claimed in claim 1, in which said amorphous solid solution comprises $V_2O_5$, $CoO_2$, $P_2O_5$ and MO in a molar ratio within the range surrounded by line EH connecting point E ($V_2O_5+CoO_2=86$ mol %, $P_2O_5=10$ mol %, MO=4 mol %) and point H ($V_2O_5+CoO_2=76$ mol %, $P_2O_5=10$ mol %, MO=14 mol %), line HL connecting point H and point L ($V_2O_5+CoO_2=76$ mol %, $P_2O_5=6$ mol %, MO=18 mol %), line LQ connecting point L and point Q ($V_2O_5+CoO_2=78$ mol %, $P_2O_5=4$ mol %, MO=18 mol %), line QN connecting point Q and point N ($V_2O_5+CoO_2=90$ mol %, $P_2O_5=4$ mol %, MO=6 mol %), line NK connecting point N and point K ($V_2O_5+CoO_2=90$ mol %, $P_2O_5=6$ mol %, MO=4 mol %) and line EK connecting point E and point K shown in FIG. 1 (wherein $CoO_2$ is contained in an amount of not more than 10 mol % based on $V_2O_5$).

* * * * *